United States Patent Office

2,824,121
Patented Feb. 18, 1958

2,824,121

PROCESS FOR PREPARATION OF OXY ALKYLIDENE COMPOUNDS

Leonard Nicholl, Nyack, Peter J. Tarsio, Stony Point, and Herbert Blohm, Garnerville, N. Y., assignors to Kay-Fries Chemicals Inc., West Haverstraw, N. Y., a corporation of New York No Drawing. Application November 4, 1954
Serial No. 466,947

10 Claims. (Cl. 260—484)

The invention relates to a process for the production of oxy alkylidene compounds and to compounds produced thereby. It is to be understood that the "oxy alkylidene" as used herein throughout the specification and the claims refers to compounds containing a radical in combination with oxygen such as the alkyl, aryl, aralkyl and alkaryl radicals, e. g. alkoxy. More particularly, it pertains to a procedure for the preparation of alkoxy methylene compounds and includes correlated improvements and discoveries whereby the production of such compounds is markedly improved and the compounds produced possess enhanced properties.

L. Claisen (Ber. 26, 2729 (1893), Ann. 279, 16 (1897), indicated that the action of triethyl ortho formate on an active methylene group proceeds through the use of acetic anhydride, which is necessary to take up the alcohol of reaction, this displacing the equilibrium. In the case of diethyl malonate, zinc chloride was found necessary for the reaction. He found that the substitution of acetic acid for acetic anhydride, in the case of ethyl acetyl acetate did not prove satisfactory.

Other investigators, Post et al. (J. Org. Chem. 2, 260 (1937)) and Fuson et al. (J. Org. Chem 11, 194–8 (1946)) have shown that the reaction to form ethoxy methylene compounds is preceded by the formation of diethoxy methyl acetate (from acetic anhydride and ortho formic ester). Thus, according to the earlier and recent researchers, the use of acetic anhydride and zinc chloride were positively required, and the use of acetic acid was just as positively contraindicated.

An object of the invention is to provide a process wherein disadvantages of prior procedures are obviated.

Another object of the invention is the provision of a process for the preparation of oxy alkylidene compounds wherein increased yields of the compounds are obtained.

Still another object of the invention is the provision of a process for the preparation of oxy alkylidene compounds which does not require a catalytic agent having drastic properties.

A further object of the invention is the provision of a process in which only a catalytic agent having weak acid properties is employed.

An additional object of the invention is to provide a process in accordance with which oxy alkylidene compounds may be produced readily, efficiently and economically A particular object of the invention is to provide a process for the preparation of oxy alkylidene compounds in which the catalytic agent is acetic acid, hence characterized in that a relatively cheap catalytic agent is utilized in contrast to a multiplicity of drastic and relatively high cost catalysts.

An especial object of the invention is to provide a process for the preparation of alkoxy methylene malonic esters by reaction between a malonic diester and a trialkyl ester of ortho formic acid under the influence solely of a low molecular weight fatty acid as catalyst.

A specific object of the invention is to provide a process for the preparation of ethoxy methylene diethyl malonate by reaction between diethyl malonate and triethyl ortho formate under the influence solely of acetic acid as catalyst.

A still further object of the invention is to provide as compositions of matter oxy alkylidene compounds in which the alkylidene group has a carbon content of $C_3$–$C_6$ and more particularly, such compounds in which the alkylidene group is propylidene.

Other objects of the invention will in part be obvious and will in part appear hereinafter.

The invention accordingly comprises the several steps, and the relation of one or more of such steps with respect to each of the others, and the composition possessing the features, properties, and the relation of components, which are exemplified in the following detailed disclosure, and the scope of the invention will be indicated in the claims.

The invention herein is directed specifically to an improved method for the preparation of ethoxy methylene malonic diethyl ester. This compound is an important starting material used in the preparation of 4,7-dichloroquinoline, which is an intermediate used in the preparation of synthetic anti-malarials. In the course of the late war with Japan, normal supplies of quinine were cut off, and the prevalence of the plasmodium types of malaria, and kindred diseases, in the Pacific theater, necessitated the rapid development of a tonnage process for the preparation of synthetic anti-malarials. Ethoxy methylene malonic diethyl ester was determined to be a key compound in this situation, and the Office of Scientific Research and Development (O. S. R. D.) allocated to the University of Illinois a project for the preparation of this critically necessary compound.

The research led to the proposal to react diethyl malonate and triethyl ortho formate, in the presence of acetic anhydride and catalytic amounts of zinc chloride, to form ethoxy methylene malonic diethyl ester. This process yielded 75% of the desired ester based on diethyl malonate and 46.2% of the ester based on the ortho formate used, and the molar ratios of diethyl malonate, triethyl ortho formate, and acetic anhydride were 1:1.35:2.3.

To be noted particularly was the relatively low yield (46.2%), based on the costly and highly reactive triethyl ortho formate used as one of the basic ingredients. This relatively low yield indicated that there was a marked decomposition of the ortho formate during the course of the reaction, and this was assumed to be due to the action of the drastic catalysts used, viz., acetic anhydride and zinc chloride.

During a careful research on the O. S. R. D. process, outlined above, the reaction conditions and reagents were carefully studied and the substitution of a single, weak catalyst, namely, e. g. the positively contraindicated acetic acid, for the required drastic combination of acetic anhydride and zinc chloride, was found to be the solution to the problem. Additionally, it was found that total elimination of zinc chloride as a catalyst, and revising the molar ratios of the reactants, permitted the use of acetic acid alone, as the catalyst, which condition had been previously contraindicated by the teachings of the earlier work. Thus, according to the present invention, the above indicated reaction, when run using the molar ratios of diethyl malonate, triethyl ortho formate, and acetic acid, of 1:1–1.2:0.2, yielded 64.5% of ethoxy methylene malonic diethyl ester based on triethyl ortho formate, and 79% based on diethyl malonate.

We have found that an appreciably higher yield of ethoxy methylene malonic diethyl ester, based on the triethyl ortho formate used is obtained by substituting a weak acid, as acetic acid, for acetic anhydride in the absence of zinc chloride, in the molar ratios given above.

This unexpected improvement is believed to be due to the use of acetic acid in minimum concentration, with a consequent lessened decomposition of the triethyl ortho formate, whereby a higher yield, based on the ortho formate, is secured.

An important result of the invention is that the cost of preparation is appreciably reduced due to the increased yield, based on the ortho formate. An additional, and commercially important result is a permitted increase in batch size, due to the reduction in the amount of the catalyst component.

In the practice of the invention, oxy alkylidene compounds are prepared by reacting a compound containing an activated methylene group with an ester of an ortho acid, especially of an ortho lower fatty acid having a carbon content of $C_1$–$C_6$, such as alkyl and aryl esters of ortho formic acid, ortho acetic acid and ortho propionic acid, and of ortho benzoic acid under the influence of a weakly acid compound, particularly a weak organic acid as catalyst. The oxy alkylidene group may be alkyl oxy as methyl, ethyl, propyl, butyl or aryloxy as phenyl, tolyl and xylyl, and the alkylidene group may have a carbon content of $C_1$–$C_6$, e. g. methylene, ethylidene and propylidene. Further, the ortho acid ester may be alkyl or aryl as just above indicated and specifically the triethyl esters.

The reaction, by way of illustration may be between a dialkyl malonate and a trialkyl ortho formate under the influence of acetic acid as catalyst, and specifically between diethyl malonate and triethyl ortho formate. It has been found that when the reactants are present in the molecular ratio of 1:1–1.2:0.2, respectively, that satisfactory results are obtained. Furthermore, distinctly advantageous results are secured when the catalytic agent is introduced in increments during the course of the reaction rather than in toto when the reaction is initiated. Moreover, the weakly acid compound may be a salt yielding an acid upon hydrolysis such as ammonium chloride, ammonium sulphate, sodium acid sulphate, ferric chloride, ammonium benzene sulphonate and weak organic acids such as low molecular weight fatty acids of a $C_2$–$C_6$ carbon content, e. g. a saturated aliphatic monobasic acid as acetic, propionic, butyric, valeric, caprylic and the like; unsaturated aliphatic monobasic acids such as acrylic acid and its homologs; polybasic acids as oxalic, malonic, fumaric, tartaric and citric acids; and aromatic monobasic acid as benzoic and salicylic acids, and aralkyl monobasic acids such as phenyl acetic acid.

The compounds containing an activated methylene group are those in which the methylene group is in combination with strongly negative groups as CN, CO, COOR and CO.COOR, in which R is alkyl, aryl or aralkyl groups, and they may either be similar or dissimilar, and such compounds may be illustrated by the following:

CN.CH$_2$.CN—malononitrile
CN.CH$_2$.COOR—cyanacetic esters
CH$_2$(COOR)$_2$—malonic esters
R.CO.CH$_2$.COOR—acylacetic esters
R.CO.CH$_2$.CO.CH$_3$—acylacetones
ROOC.CO.CH$_2$.COOR—oxalylacetic esters The compounds produced may be represented by the general formula:

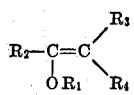

wherein $R_1$ is an alkyl group as methyl, ethyl, propyl, butyl, amyl, an aryl group as phenyl, tolyl, xylyl and naphthyl, and an aralkyl as benzyl; $R_2$ is hydrogen, and alkyl, aryl and aralkyl as designated for $R_1$; $R_3$ and $R_4$ are COO alkyl, CO alkyl, CN and CO.COO alkyl; and more particularly by the following formula:

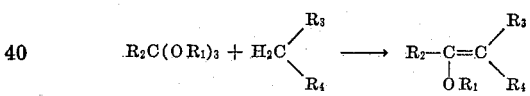

in which $x$ is a whole number 3–6 and the designations $R_1$, $R_2$, $R_3$ and $R_4$ are the same as those just above given.

Illustratively, mention may be made of alpha-ethoxy propylidene malononitrile and ethyl alpha-ethoxy propylidene cyanoacetate. As compounds containing an activated methylene group that may be utilized, the following are given:

CN.CH$_2$.CN—malononitrile
CN.CH$_2$.COOR (R is CH$_3$.C$_2$H$_5$)—cyanacetic esters
CH$_2$(COOR)$_2$ (R is CH$_3$.C$_2$H$_5$)—malonic esters
CH$_3$.CO.CH$_2$.COO.C$_2$H$_5$—acetoacetic esters
C$_2$H$_5$OOC.CO.CH$_2$.COO.C$_2$H$_5$—oxalylacetic ester
CH$_3$.CO.CH$_2$.CO.CH$_3$—acetylacetone Other similar compounds are succinyl acetic ethyl ester, propionyl acetone and butyryl acetone.

The esters of ortho acids that may be employed are exemplified by the following:

HC(OCH$_3$)$_3$—trimethyl ortho formate
HC(OC$_2$H$_5$)$_3$—triethyl ortho formate
CH$_3$C(OC$_2$H$_5$)$_3$—triethyl ortho acetate
CH$_3$CH$_2$C(OC$_2$H$_5$)$_3$—triethyl ortho propionate In the esters just above noted, it will be realized that other aliphatic groups than methyl and ethyl may constitute a part of the compounds as the propyls, the butyls and the amyls and aryl and araryl groups as phenyl, tolyl, xylyl and benzyl.

As illustrative of the reactions whereby oxy alkylidene compounds are prepared, reaction for the preparation may be represented generally by the following equation:

$$R_2C(OR_1)_3 + H_2C\diagup^{R_3}_{\diagdown R_4} \longrightarrow R_2-C=C\diagup^{R_3}_{\diagdown R_4}$$
$$\phantom{R_2C(OR_1)_3 + H_2C\diagup^{R_3}_{\diagdown R_4} \longrightarrow R_2-C} |$$
$$\phantom{R_2C(OR_1)_3 + H_2C\diagup^{R_3}_{\diagdown R_4} \longrightarrow R_2-C} OR_1$$

wherein the R's have the same significance as set forth above. Furthermore, the compounds set forth just below may be produced in accordance with the above equation.

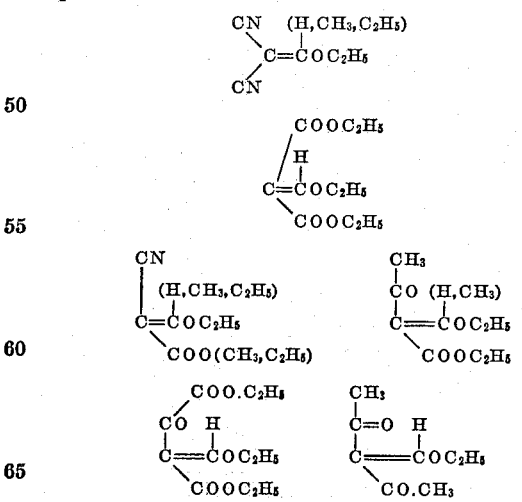

In the above compounds the groups in parentheses indicate various groups which may be present in the compounds at the positions indicated. The compounds may be prepared generally in the following manner:

One mole of an active methylene compound such as malononitrile, is added to 1–1.2 moles of an ortho acid ester such as triethyl ortho formate, in a one liter flask. The flask is equipped with an agitator, thermometer, dropping funnel for addition of the catalyst, e. g.

glacial acetic acid, and a bead packed column (2' x 1"), for the removal of the alcohol of reaction. Two-tenths of a mole of acetic acid per mole of active methylene compound is used as catalyst. For a one mole run using malononitrile and triethyl ortho formate 12 gms. of glacial acetic acid are used and added in four portions of 3 gms. each. Three gms. are added to the reaction at the start and thereafter 3 gms. for every 25 gms. of distillate. Three gms. of the acetic acid are initially added to the reaction mixture and heat applied. Alcohol is fractionated therefrom until the theoretical amount is obtained, usually 1–5 hours' reaction time is sufficient to complete the reaction. The time required is dependent upon the type of activating group involved. Thus methylene groups activated by two CN groups or a CN and a $COO.C_2H_5$ group react without difficulty in a relatively short time. Other activating groups such as a CO and a $COO.C_2H_5$ or two CO's or two $COO.C_2H_5$'s require longer periods of time.

When the theoretical amount of alcohol has been distilled off, the reaction is stopped. Any unreacted ortho ester and/or active methylene compound are recovered in vacuo. The product is distilled off in vacuo, and if it is a solid it may be crystallized from alcohol.

As an illustrative embodiment of a manner in which the invention may be practiced, the following examples are presented:

Example I 88 gms. (0.6 mole) of triethyl ortho formate, 33 gms. (0.5 mole) of malononitrile and 1.5 gms. of glacial acetic acid were placed into a one liter flask equipped with an agitator, thermometer, dropping funnel and bead packed column (2' x 1"). The reaction mixture was heated and alcohol began to distill over at a liquid temperature of about 116° C. When 13 gms. of alcohol had distilled, 1.5 gms. of glacial acetic acid were added dropwise to the reaction mixture. Two more portions of 1.5 gms. of glacial acetic acid were added at 26 gms. and 39 gms. of collected distillate. A total of 6 gms. of glacial acetic acid were used to catalyze the reaction. The reaction time was about 30 minutes at a final liquid temperature of about 132° C. The theoretical amount of alcohol was collected.

The bead packed column was replaced with a 20" Vigreux column and the low boiling constituent removed at 40 mm. The vacuum was then increased to 12 mm. and the product distilled at 160–161° C. 55 gms. of ethoxymethylene malononitrile were obtained which after recrystallization from ethanol had a melting point of 66.1–67.3° C.

Example II 97 gms. (0.6 mole) of triethyl ortho acetate, 33 gms. (0.5 mole) of malononitrile and 1.5 gms. of glacial acetic acid were measured into a flask and heated. The process of Example I was followed, and the alcohol began to distill at about 86° C. liquid temperature. The reaction time was about 35 minutes at a final liquid temperature of about 140° C. The low boiling constituent was removed at 30 mm. vacuum and alpha-ethoxy ethylidene malononitrile was obtained as a fraction boiling at 163–165° C. at 10 mm. 66.5 gms. of alpha-ethoxy ethylidene malononitrile were obtained which crystallized from ethanol at a melting point of 93.5–94.2° C.

Example III 106 gms. (0.6 mole) of triethyl ortho propionate, 33 gms. of malononitrile (0.5 mole) and 1.5 gms. of glacial acetic acid were placed into a flask and heated. The process of Example I was followed, and the alcohol began to distill at a liquid temperature of about 87° C., and the reaction time was about 30 minutes at a final liquid temperature of about 159° C. The low boiling constituent was removed, and 75 gms. of alpha-ethoxy propylidene malononitrile were obtained as a fraction boiling at 146–148° C. at 10 mm., $n_D^{20}$ 1.48813, $d_{20}^{20}$ 1.0100

Example IV 572 gms. (5.0 moles) of ethyl cyanoacetate (98.76%), 888 gms. (6.0 moles) of triethyl ortho formate and 15 gms. of glacial acetic acid were placed into a three liter flask and heated. The process of Example I was followed with 15 gms. of glacial acetic acid added after every 125 gms. of distillate with a total of 60 gms. used. The alcohol began to distill at a liquid temperature of about 125° C., and the reaction time was about 5 hours. Unused ethyl ortho formate and ethyl cyanoacetate were recovered in vacuo with 115 gms. of ethyl cyanoacetate being recovered. 579 gms. of ethyl ethoxymethylene cyanoacetate were obtained boiling at 128–132° C. at 2 mm. The conversion was 68.7% and the yield based on unrecovered ethyl cyanoacetate was 85.8%. The compound solidified in the receiver and after recrystallization from ethanol had a melting point of 51° C.

The methyl ester was likewise obtained in 75% conversion and a yield, based on unrecovered methyl cyanoacetate, of 81.7%. The compound boiled at 125–126° C. at 1–2 mm.

Example V

Using the same procedure as in Example I, 117 gms. (1 mole) of ethyl cyanoacetate (97.0%), 194 gms. (1.2 moles) of triethyl ortho acetate and 3 gms. of glacial acetic acid were placed into a one liter flask and heated. Alcohol began to distill at a liquid temperature of about 108° C. The unreacted ethyl ortho acetate and ethyl cyanoacetate were recovered, and 152 gms. of ethyl alpha-ethoxyethylidene cyanoacetate were obtained on distillation in vacuo at 5 mm. The compound recrystallized from ethanol had a melting point of 72.1–73.3° C. The conversion was 82.7% and the yield based on unrecovered ethyl cyanoacetate was 91.7%. Molecular equivalents of ethyl ortho acetate and ethyl cyanoacetate gave the same yield.

Example VI

Using the procedure of Example I, 117 gms. (1.0 mole) of ethyl cyanoacetate (97.0%), 211 gms. (1.2 moles) of triethyl ortho propionate and 3 gms. of glacial acetic acid were placed into a one liter flask and heated. Distillation of alcohol began at a liquid temperature of about 106° C. and the reaction was finished by raising the liquid temperature to about 150° C. at the end. The unreacted ethyl ortho propionate and ethyl cyanoacetate were removed in vacuo initially at 30 mm. and finally at 2 mm., and 175 gms. of ethyl alpha-ethoxy propylidene cyanoacetate were collected at 119–126° C. at 2 mm. The compound recrystallized from ethanol melted at 63.8–64.0° C. The conversion was 89.0% and the yield based on unrecovered ethyl cyanoacetate was 99.0%.

Example VII

Using the same procedure as in Example I, 390 gms. (3.0 moles) of ethyl acetoacetate, 533 gms. (3.6 moles) of triethyl ortho formate and 9.0 gms. of glacial acetic acid were placed into a two liter flask and heated. Alcohol began to distill at a liquid temperature of about 125° C. The reaction time was approximately 4 hours. The unreacted ethyl ortho formate and ethyl acetoacetate were recovered by distillation in vacuo at 35–20 mm., and 300 gms. of ethyl ethoxymethylene acetoacetate were collected between 152–158° C. at 22 mm. A conversion of 53.7% and a yield of 60.5% based on unrecovered ethyl acetoacetate were obtained.

Example VIII

Using the same procedure as in Example I, 65 gms. (0.5 mole) of ethyl acetoacetate, 97.0 gms. (0.6 mole)

of triethyl ortho acetate and 1.5 gms. of glacial acetic acid were placed into a one liter flask and heated. Alcohol began to distill at a liquid temperature of about 143° C. The reaction time was approximately 1½ hours and the unreacted ethyl ortho acetate and ethyl acetoacetate were recovered in vacuo at 15 mm. 46 gms. of ethyl alpha-ethoxyethylidene acetoacetate were obtained at 98–100° C. at 1 mm. A conversion of 46% and a yield of 68% were obtained.

*Example IX*

Using the procedure of Example I, 99.5 gms. (0.53 mole) of ethyl oxalacetate, 118 gms. (0.8 mole) of triethyl ortho formate and 3.2 gms. of glacial acetic acid were placed into a one liter flask and heated. Distillation of alcohol began at a liquid temperature of about 124° C. and continued to a liquid temperature of about 155° C. A small amount of unreacted ethyl ortho formate was recovered, and 101 gms. of ethyl ethoxymethylene oxalacetate were obtained at 153–158° C. at 1 mm. The product, an oil, was distilled over a still head without fractionation because of the difficulty in distilling the glycol-thick liquid thru a column. Near the end of the distillation the vapor temperature rose considerably because of superheating. The product was pure ethyl ethoxy methylene oxalacetate. Yield was 78.3% and the material had a $n_D^{20}$ 1.48066; $n_D^{25}$ 1.47877.

Using a ratio of 0.37 mole of ethyl oxalacetate to 0.45 mole of triethyl ortho formate and 0.08 mole of glacial acetic acid, a yield of 66.8% was obtained.

*Example X*

Using the procedure of Example I, 100 gms. (1.0 mole) of acetylacetone, 179 gms. (1.2 moles) of triethyl ortho formate and 3 gms. of glacial acetic acid were placed into a one liter flask and heated. Distillation of alcohol began at a liquid temperature of about 126° C., and the theoretical yield of alcohol was obtained in approximately 70 minutes up to a liquid temperature of about 147° C. Unreacted ethyl ortho formate and acetylacetone were recovered in vacuo at 23 mm. and 90 gms. of ethoxy methylene acetylacetone were obtained at 140–142° C. at 16 mm., or 130–132° C. at 11 mm. Yield was 57.7% of theory.

*Example XI*

320 gms. of diethyl malonate (2 moles), 300 gms. triethyl ortho formate (2 moles) and 6 gms. of acetic acid are charged into a still equipped with a short column packed with Berl saddles. Temperature of the reaction mixture brought up to 150–155° C. Distillation begins about 1 to 2 hours after the still temperature reaches 150° C., and is continued, 6 gms. of acetic acid being added for every 40 gms. of distillate removed, until a minimum of 152 gms. of distillate is removed. Vapor temperature may vary from 70–75° C. If alcohol continues to distill easily, then a maximum of 160 gms. of distillate is removed, involving a total input of 30 gms. of acetic acid. The last 6 gms. of acetic acid is charged as the required amount of distillate is removed. The liquid temperature must be kept below 160° C., at all times during the distillation, as excessive temperatures result in extensive pyrone formation.

When calculated amount of distillate is removed, the still is cooled to 90–100° C. Low vacuum (minimum of 20 mm.), and heat are applied to the still, the temperature being brought up to 150° C., without fractionation, and the low boiling fractions distilled off as rapidly as possible.

The still temperature is returned to 90–100° C., and a high vacuum (20–5 mm.) applied. Distillation is continued to a liquid temperature of 155° C., and a pressure of 15 mm. or less. The unreacted diethyl malonate is then removed. The low boiling cuts are removed up to a pressure of 15 mm. and a liquid temperature of 155° C. Small cuts are taken until a refractive index ($n_D^{20}$) of 1.4580 or higher is obtained. Generally, the refractive index of the material at this point is 1.4600 or better.

The product is then distilled rapidly, a low degree of fractionation being required. The product boils from 135–140° C., at 10 mm. Distillation is continued up to a liquid temperature of 210° C., when the distillation practically stops. The product, ethoxy methylene malonic diethyl ester, thus obtained analyzes 98% or better by saponification, and the refractive index at 20° varies from 1.4600 to 1.4620.

It will be realized that the use of glacial acetic acid in the foregoing examples is not limitative, and that other weakly acid compounds mentioned herein may be utilized as catalyst.

Hereinabove reference has been made to the O. S. R. D. and the University of Illinois procedures for the preparation of ethoxy methylene malonic diethyl ester and the following tabulation indicates differences in yields and conversions with respect to those procedures and the procedure of the present invention.

REAGENTS

| Applicants' | | University of Illinois | | O. S. R. D. | |
|---|---|---|---|---|---|
| Wt. | Moles | Wt. | Moles | Wt. | Moles |
| 320 g. DEM | 2.0 | 320 g. DEM | 2.0 | 320 g. DEM | 2.0 |
| 300 g. TEOF | 2.02 | 400 g. TEOF | 2.7 | 400 g. TEOF | 2.7 |
| 30 g. ACH | .5 | 470 g. AC$_2$O | 4.62 | 470 g. AC$_2$O | 4.62 |
| | | .16 g. ZNCl$_2$ | (¹) | .16 g. ZNCl$_2$ | (¹) |

YIELDS

| | Percent | Percent | Percent |
|---|---|---|---|
| (A) On DEM | 91.8 | 78.8 | 78.8 |
| (B) On TEOF | 73.5 | 46.7 | 40.0 |

CONVERSIONS

| | Percent | Percent | Percent |
|---|---|---|---|
| (A) On DEM | 59.6 | 63.0 | 55.5 |
| (B) On TEOF | 59.6 | 46.7 | 40.0 |

BY-PRODUCTS; RECOVERED PRODUCT PRODUCED

| Wt. | Moles | Wt. | Moles | Wt. | Moles |
|---|---|---|---|---|---|
| 4.5 TEOF | 0.28 | 49.4 DEM | .308 | 74.40 g. DEM | 0.465 |
| 103 g. DEM | 0.645 | 3.0 g. DEMME | .011 | 270.0 g. EMME | 1.11 |
| 257 g. EMME | 1.19 | 273.0 g. EMME | 1.27 | | |

¹ Catalytic amounts.

In the foregoing, DEM is diethyl malonate; TEOF is triethyl ortho formate; ACH is acetic acid; AC$_2$O is acetic anhydride; EMME is ethoxy methylene malonic diethyl ester; and DEMME is diethoxy methylene malonic diethyl ester.

Moreover, the procedure of the present invention leads to a decrease in the batch size of approximately 40%, eliminates the use of acetic anhydride and of zinc chloride, hence, obviates the step of filtering to remove zinc chloride at the end of the reaction; obviates variations in yield apparently due from varying amounts of decomposition, e. g. of triethyl ortho formate. In addition, the use of catalytic amounts of glacial acetic acid instead of an excess of acetic anhydride leads to economies; gives a better yield of the oxy alkylidene compound and minimizes the decomposition of the ortho ester used. Consequently, an appreciably smaller amount of the ortho ester may be used in the reaction and as above indicated, the elimination of the excess of acetic anhydride and the reduction in the amount of the ortho ester coupled with better yields and simplified operations enables the cost of carrying-out the reactions to be lowered appreciably.

We have found that the presence of neither acetic anhydride nor zinc chloride is necessary in order to have the reaction proceed; that the use of a weak organic acid such as acetic, propionic and butyric acids and homologs thereof exerts a distinct catalytic effect on the reaction so that both the yield and the conversion are appreciably increased, and the procedure for the preparation of the oxy alkylidene compounds is markedly simplified due to the complete elimination of acetic anhydride and zinc chloride.

The compounds that are produced by the procedure herein described may be utilized as intermediates in the preparation of various compounds such as various pharmaceuticals, pyrimidines, vitamin $B_1$, glutaconic esters, coumarins, parazoles, pyridines and quinolines.

This application is a continuation-in-part of co-pending application Serial No. 278,744, filed March 26, 1952, entitled Preparation of Alkoxy Alkylene Malonic Dialkyl Esters, now abandoned.

It will thus be seen that the objects set forth above, among those made apparent from the preceding description, are efficiently attained and, since certain changes may be made in carrying out the above process and in the composition set forth without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A process for the preparation of oxy alkylidene compounds which comprises reacting a compound containing a methylene group activated by a strongly negative radical which is selected from the group consisting of CN, CO, COOR and CO.COOR, in which R is selected from the group consisting of alkyl, aryl and aralkyl radicals with an ester of an ortho acid belonging to the group consisting of lower fatty acids having a carbon content of $C_1$–$C_6$ and benzoic acid under the influence of a weakly acid compound as catalyst.

2. A process for the preparation of oxy alkylidene compounds which comprises reacting a compound containing a methylene group activated by a strongly negative radical which is selected from the group consisting of CN, CO, COOR and CO.COOR, in which R is selected from the group consisting of alkyl, aryl and aralkyl radicals with an ester of an ortho lower fatty acid having a carbon content of $C_1$–$C_6$ under the influence of a weak organic acid as catalyst.

3. A process for the preparation of oxy alkylidene compounds which comprises reacting a compound containing a methylene group activated by a strongly negative radical which is selected from the group consisting of CN, CO, COOR and CO.COOR, in which R is selected from the group consisting of alkyl, aryl and aralkyl radicals with an ester of an ortho lower fatty acid having a carbon content of $C_1$–$C_6$ under the influence of a weak organic acid as catalyst, said weak organic acid being added in increments.

4. A process for the preparation of oxy alkylidene compounds which comprises reacting a compound containing a methylene group activated by a strongly negative radical which is selected from the group consisting of CN, CO, COOR and CO.COOR, in which R is selected from the group consisting of alkyl, aryl and aralkyl radicals with an ester of an ortho lower fatty acid having a carbon content of $C_1$–$C_6$ under the influence of acetic acid as catalyst.

5. A process for the preparation of oxy alkylidene compounds which comprises reacting a compound containing a methylene group activated by a strongly negative radical which is selected from the group consisting of CN, CO, COOR and CO.COOR, in which R is selected from the group consisting of alkyl, aryl and aralkyl radicals with a trialkyl ester of an ortho lower fatty acid having a carbon content of $C_1$–$C_6$ under the influence of a low molecular weight fatty acid of a $C_2$–$C_6$ carbon content as catalyst.

6. A process for the preparation of oxy alkylidene compounds which comprises reacting a compound containing a methylene group activated by a strongly negative radical which is selected from the group consisting of CN, CO, COOR and CO.COOR, in which R is selected from the group consisting of alkyl, aryl and aralkyl radicals with triethyl ortho formate under the influence of acetic acid as catalyst.

7. A process for the preparation of ethoxy methylene malonic diethyl ester which comprises reacting diethyl malonate with triethyl ortho formate under the influence of acetic acid as catalyst.

8. A process for the preparation of ethoxy methylene malonic diethyl ester which comprises reacting diethyl malonate with triethyl ortho formate under the influence of acetic acid as catalyst in the following respective molecular ratios: 1:1–1.2:0.2, said acetic acid being added in increments.

9. In the process for the preparation of ethoxy methylene malonic diethyl ester wherein 2.0 moles of diethyl malonate and 2.10 moles of triethyl ortho formate are reacted in the presence of a drastic catalyst comprised of 4.62 moles of acetic anhydride and catalytic amounts of zinc chloride, and wherein the yield of ethoxy methylene malonic diethyl ester, based on the ortho formate, approximates 46%, the improvement which comprises reacting 2.0 moles of diethyl malonate and 2.02 moles of triethyl ortho formate, in the presence of 0.5 moles of acetic acid as the sole catalyst, whereby a yield of 64.5% ethoxy methylene malonic diethyl ester, based on the ortho formate, is secured.

10. In a process for the preparation of ethoxy methylene malonic diethyl ester wherein diethyl malonate and triethyl ortho formate are reacted in the presence of a preponderating amount of a drastic catalyst comprised of acetic anhydride and zinc chloride, the improvement comprising substituting a mild catalyst, comprised solely of catalytic amounts of acetic acid, for the said drastic catalyst.

(References on following page)

References Cited in the file of this patent

UNITED STATES PATENTS 2,375,185 Bergel et al. _____ May 8, 1945
2,721,799 Edwards et al. _____ Oct. 25, 1955

OTHER REFERENCES

Sah: Jour. Am. Chem. Soc., vol. 53, pp. 1836–9 (1931).
Urushibara et al.: 31 Chem. Abst., column 1769 (1937).
Pascual et al.: 39 Chem. Abst., col. 4329 (1945).
Pascual et al.: 44 Chem. Abst., cols. 3884–3885 (1950).